US009218699B1

(12) United States Patent
McIntyre et al.

(10) Patent No.: US 9,218,699 B1
(45) Date of Patent: Dec. 22, 2015

(54) FIREARM SAFE FOR FACILITATING FIREARM RECEIPT

(71) Applicant: Safe Fast Guns LLC, Wilsonville, OR (US)

(72) Inventors: Scott McIntyre, Portland, OR (US); Jason Hartenberger, Wilsonville, OR (US)

(73) Assignee: Safe Fast Guns LLC, Wilsonville, OR (US)

( * ) Notice: Subject to any disclaimer, the term of this patent is extended or adjusted under 35 U.S.C. 154(b) by 0 days.

(21) Appl. No.: 14/639,571

(22) Filed: Mar. 5, 2015

(51) Int. Cl.

| | |
|---|---|
| ***G05B 19/00*** | (2006.01) |
| ***G07C 9/00*** | (2006.01) |
| ***E05G 1/00*** | (2006.01) |
| ***F41C 33/06*** | (2006.01) |
| ***E05B 65/00*** | (2006.01) |
| *F41A 17/06* | (2006.01) |
| *F41A 23/18* | (2006.01) |

(52) U.S. Cl.
CPC ........ *G07C 9/00158* (2013.01); *E05B 65/0075* (2013.01); *E05G 1/005* (2013.01); *F41C 33/06* (2013.01); *F41A 17/066* (2013.01); *F41A 23/18* (2013.01)

(58) Field of Classification Search
USPC ................................................ 340/5.82, 5.83
See application file for complete search history.

(56) References Cited

U.S. PATENT DOCUMENTS

| | | | | |
|---|---|---|---|---|
| 1,430,081 A | | 9/1922 | Holler | |
| 1,557,339 A | * | 10/1925 | Sander | B60R 7/14 224/542 |
| 4,688,023 A | * | 8/1987 | McGill | E05B 65/0014 200/61.74 |
| 5,161,396 A | * | 11/1992 | Loeff | E05B 47/0002 109/59 T |
| 5,920,640 A | * | 7/1999 | Salatino | G06K 9/0002 235/380 |
| 5,987,941 A | | 11/1999 | Zocco | |
| 6,177,876 B1 | * | 1/2001 | Krueger | G08B 13/1472 200/85 R |
| 6,570,501 B2 | * | 5/2003 | Bushnell | E05B 47/0002 206/1.5 |
| 6,843,081 B1 | | 1/2005 | Painter | |
| 7,434,427 B1 | | 10/2008 | Miresmaili | |
| 8,104,313 B2 | | 1/2012 | Wolfe | |
| 8,186,188 B1 | | 5/2012 | Brown | |
| 8,201,426 B2 | | 6/2012 | Heim et al. | |
| 8,730,043 B1 | * | 5/2014 | Guincho | G06Q 20/363 235/375 |
| 8,770,117 B2 | * | 7/2014 | Wall | E05G 1/024 109/48 |
| 2004/0125993 A1 | * | 7/2004 | Zhao | G06K 9/00006 382/124 |
| 2006/0152371 A1 | * | 7/2006 | Marsilio | A47F 7/024 340/572.9 |
| 2006/0290492 A1 | * | 12/2006 | Jidas | G08B 13/08 340/545.6 |
| 2008/0192993 A1 | * | 8/2008 | Allen | G06K 9/00919 382/124 |
| 2010/0212372 A1 | * | 8/2010 | Wolfe | A47B 81/00 70/78 |
| 2010/0301996 A1 | * | 12/2010 | Stradiota | E05B 47/00 340/5.53 |
| 2011/0001407 A1 | * | 1/2011 | Stradiota | E05B 65/0075 312/237 |
| 2011/0079170 A1 | * | 4/2011 | Al-Mutairi | E05G 1/10 109/23 |

(Continued)

*Primary Examiner* — Jennifer Mehmood
*Assistant Examiner* — Rufus Point
(74) *Attorney, Agent, or Firm* — Schwabe, Williamson & Wyatt

(57) ABSTRACT

A firearm safe is described which may provide a firearm in a state for ready access such that release of the firearm from the safe is performed when a user's hand is in position to readily accept and use the firearm with no or minimal avoidance of obstructions. The firearm safe may maintain the firearm in a locked and protected position when access is not desired and may carry the firearm on a carriage assembly. The firearm safe may provide the firearm only upon activation by a user, such as by biometric or RFID readers. Upon such activation, the firearm safe may provide the firearm to the user. The biometric readers may be positioned such that, upon release of the firearm, the user's hand may be in position to receive the firearm with minimal or no obstructions and may readily grasp the firearm for use.

18 Claims, 8 Drawing Sheets

(56) References Cited

U.S. PATENT DOCUMENTS

| | | | | |
|---|---|---|---|---|
| 2011/0162564 | A1* | 7/2011 | Heim | E05G 1/005 109/48 |
| 2011/0247950 | A1 | 10/2011 | McGee | |
| 2012/0280008 | A1* | 11/2012 | Rossetti | F41C 33/0236 224/243 |
| 2013/0025511 | A1* | 1/2013 | Maxwell | E05G 1/04 109/59 R |
| 2013/0298807 | A1* | 11/2013 | Wall | E05G 1/024 109/38 |
| 2014/0231480 | A1 | 8/2014 | Baker | |

* cited by examiner

FIREARM SAFE FOR FACILITATING FIREARM RECEIPT

TECHNICAL FIELD

The present disclosure relates to the field of firearm security, and in particular, to a safe for facilitating quick delivery of a firearm for use.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Solutions for storage and transport of firearms vary. Oftentimes, firearms may be stored in secure firearm safes such that they may be secured from unauthorized use and/or transported while respecting local laws. However, many such firearm safes do not provide for easy access to firearms. Safes may require the use of a key or combination lock, which may delay access to a firearm; such a delay may be very undesirable during an emergency. Keys and combination lock solutions are also subject to potential lost keys and/or forgotten combinations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1A:
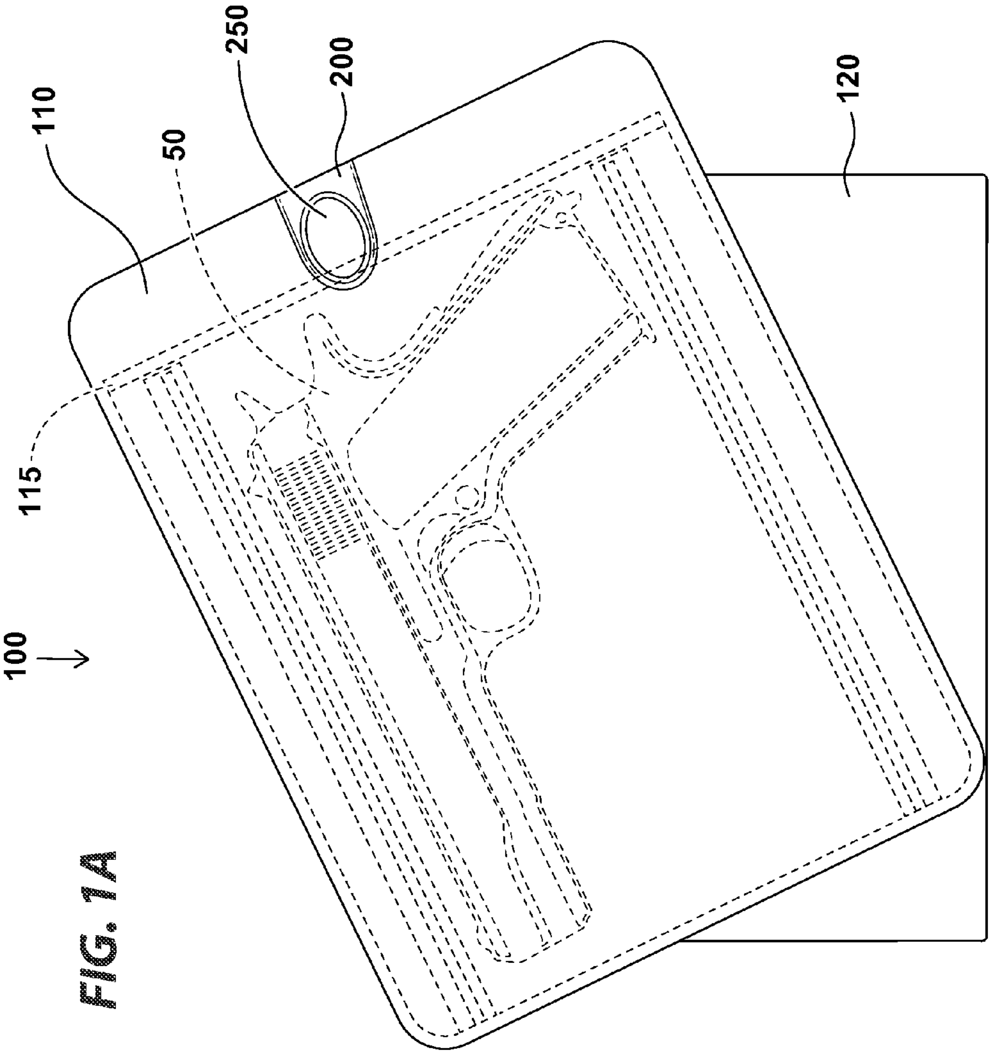
FIGS. 1A and 1B illustrate example side views of a firearm safe with a firearm in a stored position, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

In the following description, the term "firearm" refers generally to any type of portable gun or firearm which may be deployed by an individual. The terms "safe" or "compartment" are interchangeable and refer to housings that can house at least one firearm and which can be secured when desired.

In various embodiments, a firearm safe is described which may provide a firearm in a state for quick access such that release of the firearm from the safe is performed when a user's hand is in position to readily accept the firearm with no or minimal avoidance of obstructions. The firearm safe may be configured to maintain the firearm in a locked and stored position when access is not desired. The firearm may be maintained and carried in this stored position on a carriage assembly. The firearm safe may be configured to provide the firearm only upon activation by a user, for example by positioning the user's hand and identifying the user. Such activation may include the use of one or more biometric readers, such as, but not limited to, fingerprint readers. The firearm safe may also utilize, in addition to or in substitution for the biometric readers, other sensors which may identify the user, such as near-field RFID tags, which may be disposed in rings, bracelets, clothing and/or subcutaneous implants. The firearm safe may also utilize one or more pressure sensors. Upon such activation, the firearm safe may be configured to provide the firearm on the carriage assembly into the user's hand such that the firearm may be accessed. The biometric readers or other sensors may be positioned such that, upon activation of the firearm safe and release of the firearm, the user's hand, the same one that was used to activate the firearm safe, is in position to receive the firearm.

While descriptions herein describe delivery of a firearm "into" the hand of a user, it may be recognized that, in various embodiments, such delivery may or may not directly contact the hand of the user. For example, in some scenarios, the firearm may be delivered slightly short of the user's hand, directly into contact with the hand, or slightly past the position of the user's hand, such that the user's hand may be pushed back. These scenarios may vary based on such aspects as hand size or shape of the user or the shape or size of the firearm. As discussed above, in these embodiments, the firearm safe is configured to deliver the firearm sufficiently close to the hand of the user that the user may readily grip the firearm for use without obstruction with minimal avoidance of obstructions.

Figure 1B:
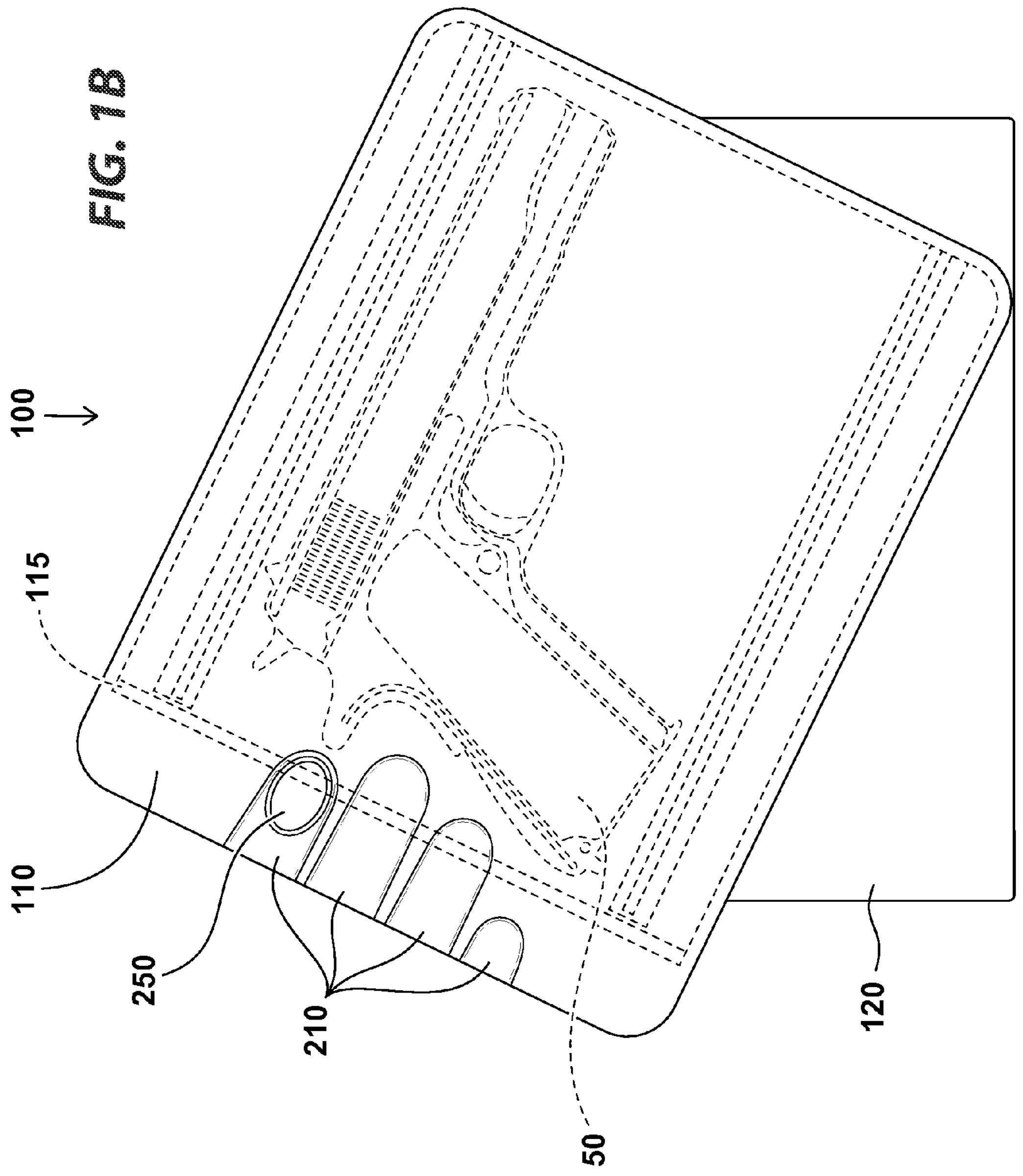

Referring now to FIGS. 1A and 1B, example side views of a firearm safe 100 with a firearm 50 in a stored position are shown in accordance with various embodiments. The firearm safe 100 may include a compartment 110 which may provide a top, bottom, and sides that may substantially enclose the firearm 50 when the firearm 50 is in a stored position. The firearm safe 100 may also include one or more doors 115, which may close when the firearm 50 is in a stored position in order to completely or substantially enclose the firearm 50. In various embodiments, when in a stored position, the firearm 50 may be positioned such that it is entirely enclosed by the combination of the compartment 110 and the doors 115. In various embodiments, the compartment 110 and doors 115 may be made of sufficiently resilient materials that the firearm 50 may be protected from access when the firearm 50 is stored in the firearm safe 100. Such materials may be known to those of ordinary skill in the art.

In various embodiments, the firearm safe 100 may include one or more biometric readers 250, which may include sensors which may be configured to read biometric data from a user's hand. The firearm safe 100 may be further configured to release the firearm 50 for use upon determination that the biometric data from the user's hand matches stored biometric data for an authorized user. In various embodiments, the biometric data may include, but is not limited to fingerprint data. In various embodiments, in lieu of (or in addition to) one or more of the biometric readers 250, the firearm safe 100 may include sensors for other data, such as, but not limited to, pressure data, temperature data, pulse data, etc., as may be understood by those of ordinary skill in the art. As discussed above, in various embodiments, the firearm safe 100 may also utilize, in addition to or in substitution for the biometric readers 250, other sensors which may identify the user, such as through identification of near-field RFID tags, which may be disposed in rings, bracelets, clothing and/or subcutaneous implants.

In embodiments, sensors may be provided on one or both sides of the firearm safe 100. When on both sides of the firearm safe 100, the sensors may be the same or different, for example, there may be biometric readers on both sides, or there may be a biometric reader on one side and a pressure, temperature, or pulse sensor on the opposite side. Additional combinations are contemplated within the context of the description above.

In various embodiments, the biometric readers 250 may be coupled to a microprocessor or other logic which may be configured to determine whether biometric data read by the biometric readers 250 is a match to biometric data for authorized users.

In various embodiments, the biometric readers 250 may be positioned to guide positioning of a user's hand during activation of the firearm safe 100 to release the firearm 50. For example, in various embodiments, the firearm safe 100 may include at least a biometric reader 250 for a thumb and a biometric reader for a finger which may be placed on opposite sides of the compartment 110. Through placement of the biometric readers 250 on opposite sides of the compartment, the firearm safe 100 may better ensure that the user's hand is placed such that the firearm 50 will be delivered into the palm of the user's hand when in the released position.

In various embodiments, the firearm safe 100 may also include a thumb guide 200 as well as one or more finger guides 250. In various embodiments, the thumb guide 200 and finger guides 250 may also be positioned to guide a user's hand for activation of the firearm safe 100 to release the firearm 50. In various embodiments, the one or more biometric readers 250 may be positioned so that they coincide with the positions of the thumb guide 200 and/or finger guides 210. In various embodiments the thumb guide 200 and/or finger guides 210 may be configured as indents or depressions in the exterior of the compartment 110 such that a thumb and finger of a hand may be rested in the thumb guide 200 and/or finger guides 210. In other embodiments the thumb guide 200 and/or finger guides 210 may include visual indicators that are positioned to demonstrate where a thumb and/or fingers may be placed in order for the hand to receive the firearm 50 and may or may not include indents or depressions. Such visual indicators may include markings, lights, etc.

In various embodiments, different combinations of biometric readers 250 and thumb guide 200 and/or finger guides 210 may be utilized. Thus, in various embodiments, biometric readers 250 may be included only with a subset of the thumb guide 200 and/or finger guides 210. For example, in FIGS. 1A and 1B, biometric readers 250 are only included for the thumb and index finger of a hand. Conversely, in various embodiments, the firearm safe 100 may include only thumb guide 200 and/or finger guides 210 for thumbs or fingers for which biometric readers 250 are included. In such embodiments, thumb guide 200 and/or finger guides 210 may be omitted for non-read thumbs or fingers. In various embodiments, non-biometric sensors may be utilized, such as RFID sensors which may be used to identify RFID tags in a ring, bracelet, or implanted in the user's body to identify the user. In some such embodiments, the firearm safe 100 may utilize pressure sensors in concert with the non-biometric sensors in order to identify that the user's hand is in position.

In various embodiments the firearm safe 100 may be supported with a support 120, such as a stand or bracket, such that the firearm safe 100 may be disposed at an angle for easier access by a hand, such as during biometric reading and/or release of the firearm 50.

Figure 2A:
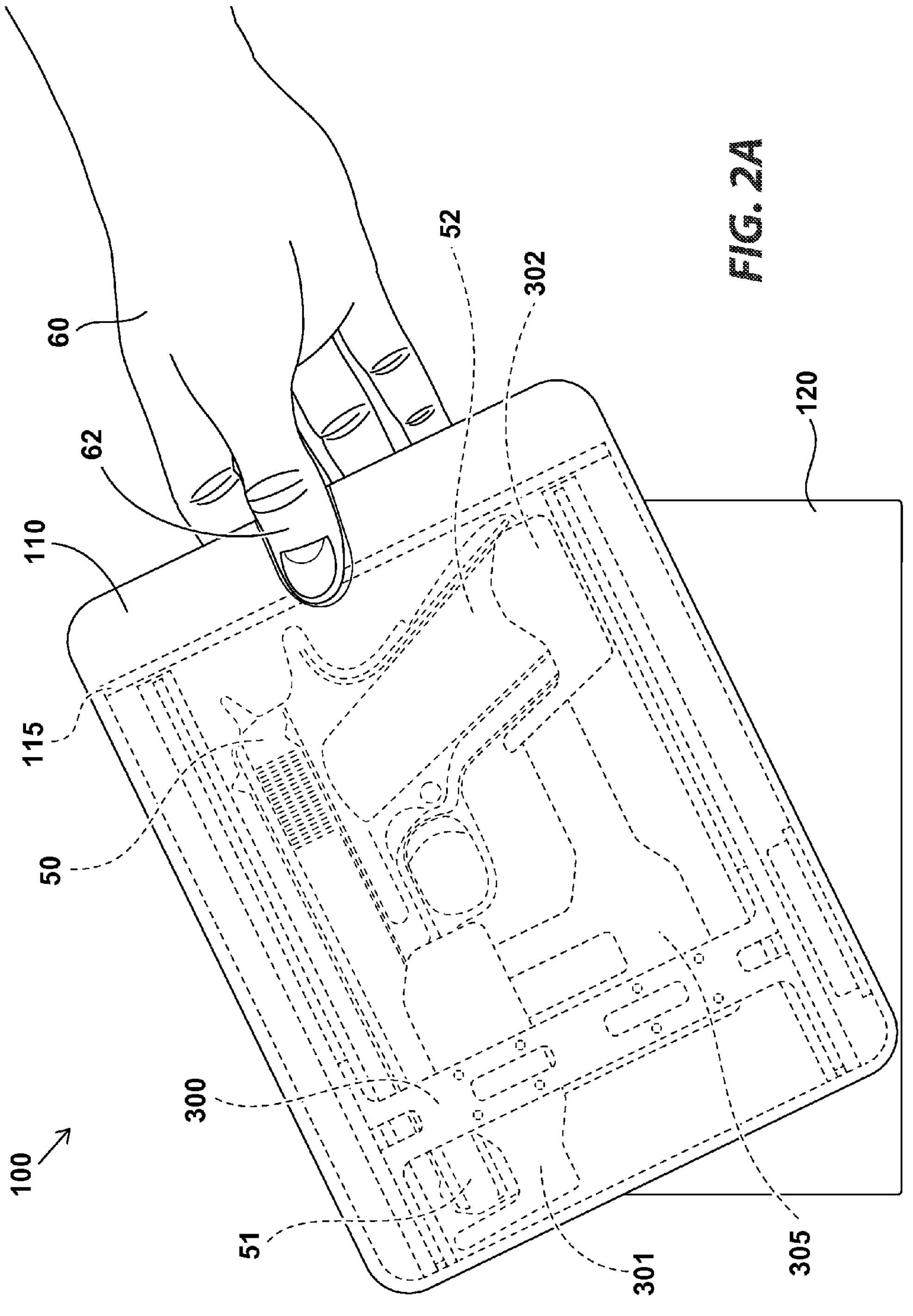
FIGS. 2A and 2B illustrate example side views of the firearm safe with a carriage assembly and firearm in a stored position and a hand in position to receive the firearm upon release, in accordance with various embodiments.
Figure 2B:
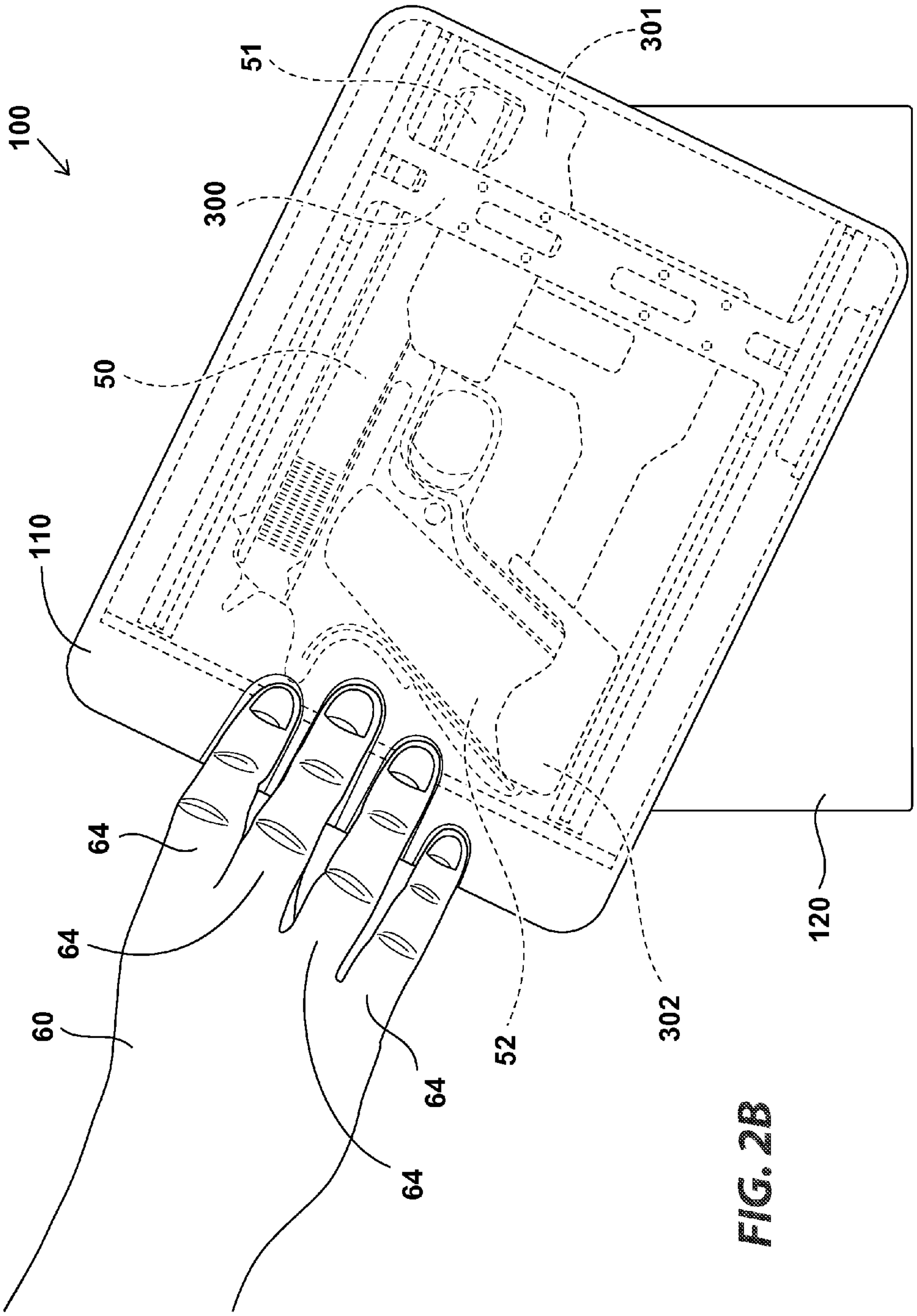

Referring now to FIGS. 2A and 2B, example side views of the firearm safe 100 with a carriage assembly 300 and firearm 50 in a stored position and a hand 60 in position to receive the firearm 50 upon release are shown in accordance with various embodiments. As illustrated in FIGS. 2A and 2B, a hand 60 is placed in position to activate the firearm safe 100 and to receive the firearm 50. In various embodiments, and as illustrated, a thumb 62 of the hand 60 may be placed in or on the thumb guide 200, and one or more fingers 64 may be placed in or on the finger guides 210. As FIGS. 2A and 2B illustrate, the thumb guide 200 and/or finger guides 210 may, through their placement on the exterior of the firearm safe 100, direct placement of the thumb 62 and one or more fingers 64 during activation of the firearm safe 100. The placement may be such that the firearm 50, when released, may be released into the hand 60 so that the user may grasp the firearm 50 with the hand 60 without encountering obstacles or even being required to view the firearm safe 110 or firearm 50.

As illustrated in FIGS. 2A and 2B, the firearm 50 may be supported in the compartment 110 by a carriage assembly 300. The carriage assembly 300 may include various elements for supporting the firearm 50 in the compartment 110 as well as for extending and delivering the firearm 50 to the hand 60 upon activation of the firearm safe 100. For example, the carriage assembly 300 may include a barrel rest 301, which may be configured to receive a barrel 51 of the firearm 50 when the firearm 50 is placed in the firearm safe 100. Similarly, the carriage assembly 300 may include a grip rest 302, which may be configured to receive a grip 52 of the firearm 50 when the firearm 50 is placed in the firearm safe 100. In various embodiments, the barrel rest 301 and the grip rest 302 may be disposed such that the firearm 50 may be withdrawn from both barrel rest 301 and the grip rest 302 in a single motion. In various embodiments, this motion may be performed along a longitudinal axis of the firearm safe 100, as may be described below. In various embodiments, the barrel rest 301 and the grip rest 302 may be coupled with a carriage bracket 305, which may provide for additional support of the firearm 50, as well as coordinated movement of the firearm 50 upon activation of the firearm safe 110. In various embodiments, other configurations may be utilized for the carriage assembly 300, including configurations that do not include one or more of the barrel rest 301, the grip rest 302, and/or the carriage bracket 305, and which may include different elements for support and delivery of the firearm 50, as may be understood. For example, in some embodiments, the carriage assembly 300 may include a holster that may grip the gun more tightly and/or at more points; in other embodiments, other configurations may be utilized.

Figure 3:
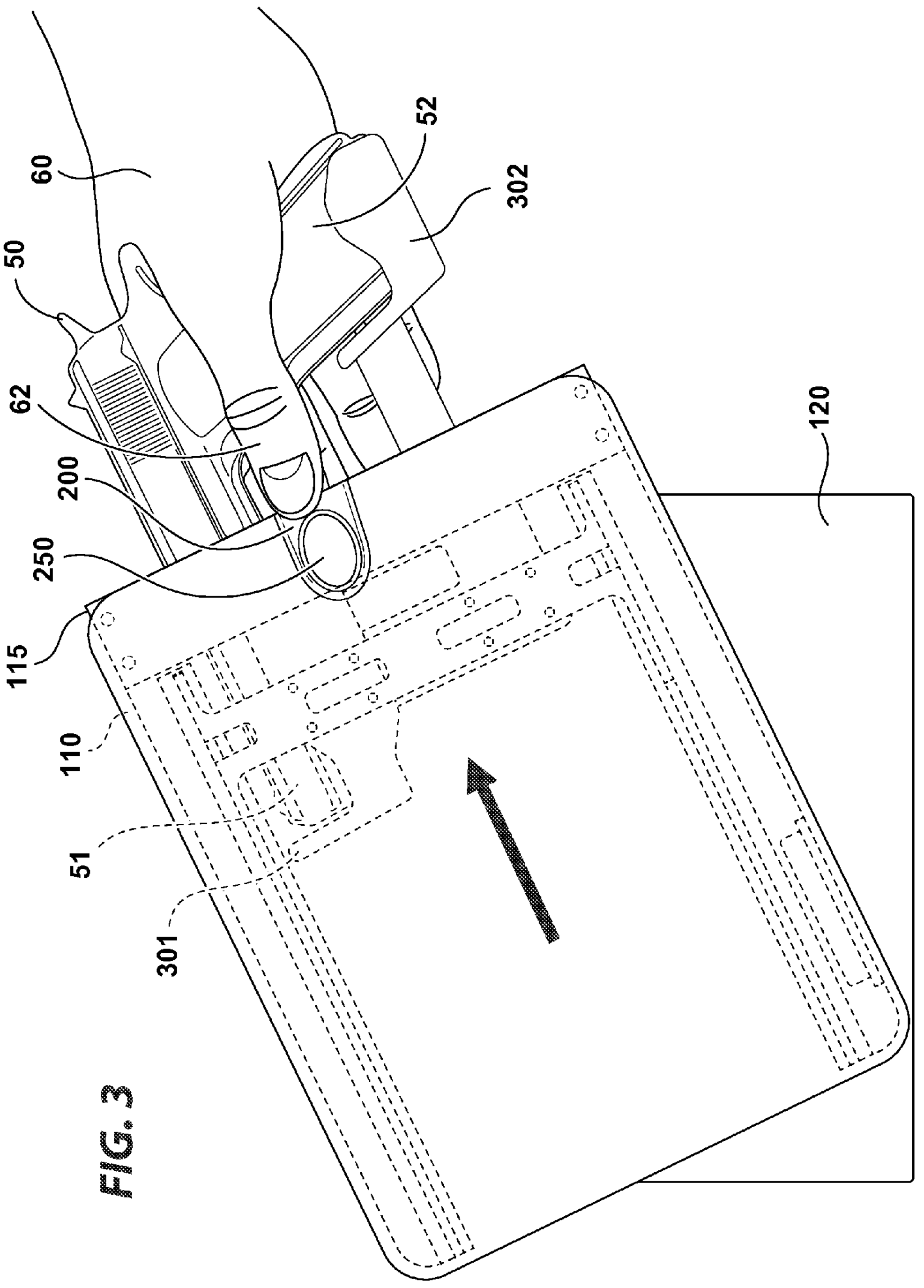
FIG. 3 illustrates an example side view of the firearm safe with the carriage assembly and firearm in a released position where the firearm is available to be delivered into the hand, in accordance with various embodiments.

Referring now to FIG. 3, an example side view of the firearm safe 100 with the carriage assembly 300 and firearm 50 in a released position where the firearm 50 is available to be grasped and used by the hand 60 is shown in accordance with various embodiments. As illustrated in FIG. 3, the firearm safe 100 has been activated, and the carriage assembly 300 and firearm 50 have been moved to a released position. As illustrated, the carriage assembly 300 and firearm 50 have extended along a longitudinal axis of the firearm safe 100, illustrated by the arrow. In the released position, the firearm 50 is now readily able to be grasped by the hand 60 with minimal or no obstructions, as the hand 60 was previously placed in position to receive the firearm 50 due to the placement of the biometric readers 250 and the thumb guide 200 and finger guides 210. The operator may simply close their hand around grip 52 of the firearm 50 and remove the firearm 50 for use.

As the example of FIG. 3 illustrates, the firearm 50 may, in various embodiments, be readily removed from the carriage assembly along the same longitudinal axis through which the carriage assembly 300 and firearm 50 traveled to reach the released position. Additionally, when the carriage assembly 300 and firearm 50 are in the released position, the doors 115 may move to an open position, as illustrated in FIG. 3. In various embodiments, the doors 115 may be configured to swing out of the way of the firearm 50 and carriage assembly 300 during release of the firearm 50. In various embodiments, the doors 115 may move by being pushed out of the way by firearm 50 and carriage assembly 300 and/or on their own, such as through the use of one or more springs or other tensioned elements.

Figure 4:
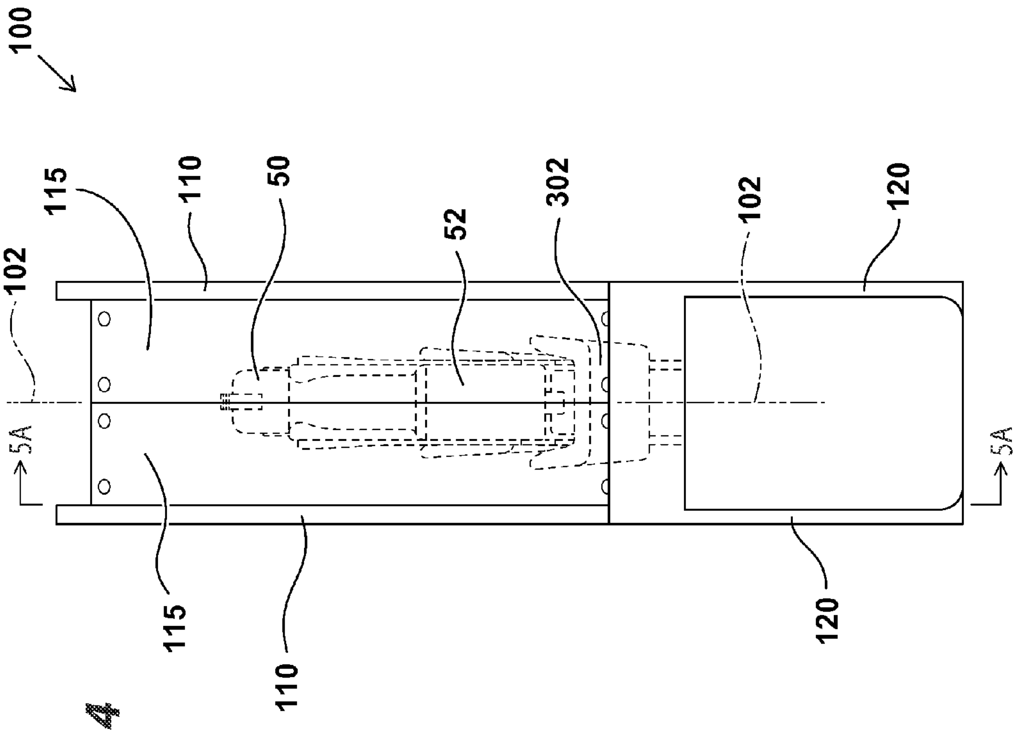
FIG. 4 illustrates an example front view of the firearm safe with the carriage assembly and firearm in a stored position and with doors in a closed position, in accordance with various embodiments.

FIG. 4 illustrates an example front view of the firearm safe 100 with the firearm 50 in a stored position and with doors 115 in a closed position, in accordance with various embodiments. In various embodiments, the firearm 50 may be disposed internally to the doors 115 such that the doors 115 prevent access to the firearm 50 when the firearm safe 100 is in the locked position. As illustrated, the grip 52 of the firearm is resting in the grip rest 302 such that, when the firearm 50 is extended from the firearm safe 100, the grip 52 will be delivered into the hand 60 of the user.

In various embodiments, the doors 115 may include two doors which are disposed laterally on either side of a midline plane 102. The doors 115 may be configured to open by swinging away from the midline plane 102. By swinging away, the doors may be configured to avoid creating an obstacle for extension of the firearm 50 and carriage assembly 300, as well as avoiding an obstacle for the hand 60 of the user to be in position to receive the firearm 50. In various embodiments, the doors 115 may be configured to swing substantially internally to the firearm safe 100, such as to avoid collision with the hand 60 of the user when the firearm safe 100 is activated.

Figure 5A:
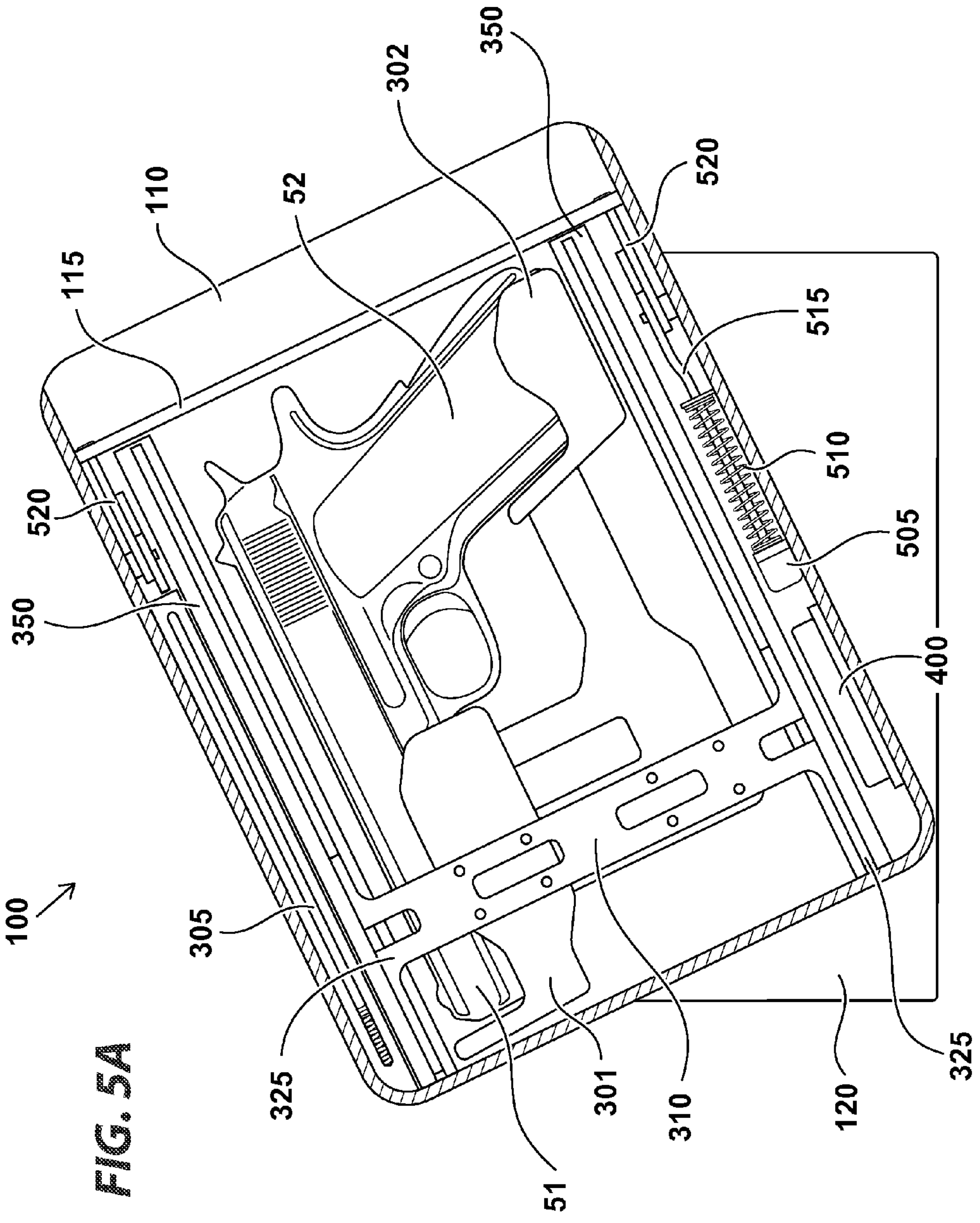
FIGS. 5A and 5B illustrate example cutaway views of the firearm safe showing portions of the firearm safe and carriage assembly in a stored position and a released position, respectively, in accordance with various embodiments.
Figure 5B:
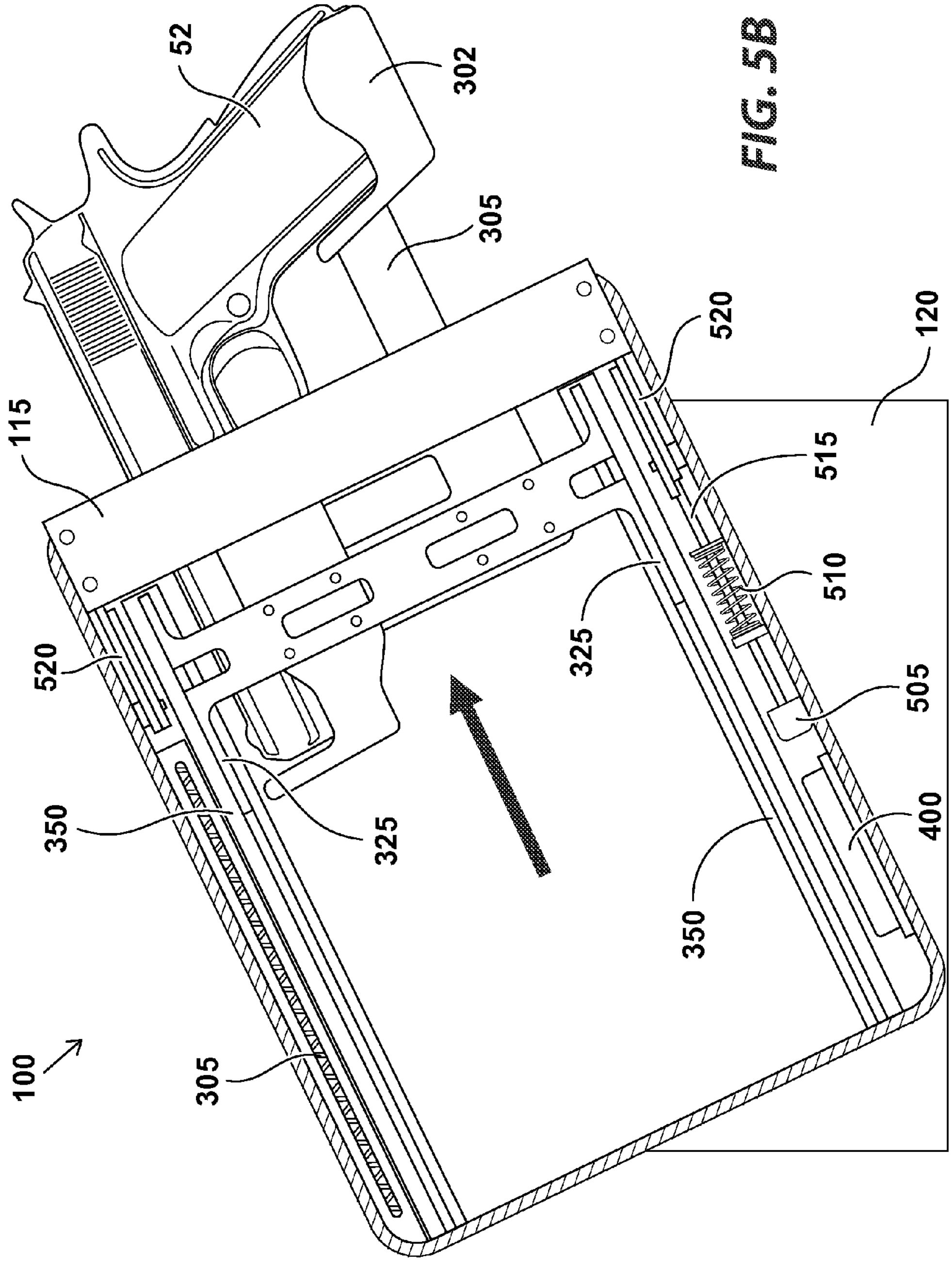

FIGS. 5A and 5B illustrate example cutaway views of the firearm safe 100 showing portions of the firearm safe 100 and carriage assembly 300 in a stored position and a released position, respectively, in accordance with various embodiments. The location at which the cutaway view is taken may be seen in FIG. 4. In various embodiments, the carriage assembly 300 may include one or more side brackets 310, which may be coupled to one or more of the barrel rest 301, the connecting bracket 305, and/or the grip rest 302. The side brackets 310 may include one or more sliding portions 325 which may, in turn, be disposed into one or more rails 350. Through disposition of the sliding portions 325 into the rails 350, the carriage assembly may be facilitated in sliding along the longitudinal axis of the firearm safe 100. The carriage assembly 300 may be assisted in sliding along the longitudinal axis through action of a release spring 505, which may be disposed such that the release spring is under tension when the carriage assembly 300 is placed in the stored position in the firearm safe 100 (FIG. 4A). The firearm safe 100 may additionally contain a locking pin or other locking mechanism (not illustrated) which may lock the carriage assembly 300 under tension from the release spring 505. In various embodiments, the release spring 505 may be placed under tension by a user moving the carriage assembly 300 and the firearm 50 to return the carriage assembly 300 and the firearm 50 to the stored position. Upon activation of the firearm safe, the locking mechanism may release the carriage assembly 300 such that it may be driven along the longitudinal axis into the released position (FIG. 4B). It may be recognized that, while particular configurations of the carriage assembly 300, rails 350, and release spring 505 are illustrated in FIGS. 4A and 4B, in various embodiments different configurations may be utilized, as may be understood.

In various embodiments, the doors 115 may be coupled to one or more door hinges 520. In various embodiments, these door hinges 520 may be coupled to and manipulable by door hinge activators 515. While in some embodiments the doors may be opened by being pushed by the carriage assembly 300 during release of the firearm 50, in various embodiments, the door hinge activators 515 may be configured to pull one or more of the door hinges 520 to cause closure of the doors 115 when the carriage assembly 300 and the firearm 50 are returned to a stored position, such as when a user moves the carriage assembly 300 and the firearm 50 to the stored position. In various embodiments, the firearm safe 100 may include one or more door springs 510, which may be coupled to the door hinge activators 515 and which may be placed under tension upon opening of the doors during release of the firearm 50, such as through pulling by the door hinge activators 515 (FIG. 4B). Upon movement of the carriage assembly 300 and the firearm 50 to the stored position, the door springs 510 may be allowed to release tension up to a door spring stop 505 and, in doing so, pull the door hinge activators 515 to cause closure of the doors 115. In other embodiments, other mechanisms may be utilized for closure of the doors or the doors may be closed through manual means.

In various embodiments, the firearm safe 100 may also include a microprocessor 400, which may be coupled to the biometric readers 250 and or other sensors, such as RFID sensors, pressure sensors, temperature sensors, etc. In various embodiments, the microprocessor 400 may include logic, such as software and/or hardware logic, to facilitate the microprocessor 400 in storing biometric data or other sensor data (such as an ID that may be read by an RFID sensor) associated with authorized users. The microprocessor 400 may also include logic to facilitate the microprocessor 400 in comparing biometric or other data read from the biometric readers 250 or other sensors to stored biometric or other data. The microprocessor 400 may, upon determination that a user is authorized, cause release of the locking mechanism of the firearm safe 100 and delivery of the firearm 50 into the hand 60.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus for providing a firearm in a state ready to be used comprising:
- a housing;
- a carriage assembly disposed internally in the housing, wherein the carriage assembly is configured to extend the firearm from the housing; and
- a release disposed externally on the housing, the release configured such that activation of the release causes a user to place a hand of the user into a position such that the firearm is delivered into the hand of the user when the firearm is extended from the housing such that the firearm may be readily grasped by the user without requiring the user to change the user's hand position to receive the gun in the hand of the user,
- wherein the carriage assembly comprises a support member for the firearm and the release is configured to, upon activation of the release, cause the support member for the firearm to extend to deliver the firearm directly into the hand of the user.

2. The apparatus of claim 1, wherein the release comprises one or more sensors.

3. The apparatus of claim 2, wherein the one or more sensors comprise fingerprint readers.

4. The apparatus of claim 2, wherein the one or more sensors comprise sensors configured to read one or more of pressure data, temperature data, pulse data or RFID data.

5. The apparatus of claim 3, wherein the sensors are placed on opposite sides of the firearm safe.

6. The apparatus of claim 5, wherein the sensors comprise fingerprint readers for a thumb and an index finger.

7. The apparatus of claim 2, further comprising one or more microprocessors configured to:
- receive biometric data from the one or more biometric readers;
- determine whether the user is authorized to access the firearm; and
- upon a determination that the user is authorized to access the firearm, cause the support member to release the firearm from the housing.

8. The apparatus of claim 1, wherein the release comprises one or more finger guides.

9. The apparatus of claim 1, wherein the housing comprises a door.

10. The apparatus of claim 9, wherein the release is configured to, upon activation of the release, cause the door to open.

11. The apparatus of claim 9, wherein the door is configured to remain in a locked position until the release is activated.

12. The apparatus of claim 11, wherein the housing comprises a top, bottom, and sides such that the top, bottom, sides, and door prevent physical access to the firearm when the door is locked.

13. The apparatus of claim 9, wherein the door comprises a plurality of door panels.

14. A method of using a firearm safe, the method comprising:
- receiving biometric data from one or more of a thumb and/or fingers of a hand of a user, wherein:
- the thumb and/or fingers are placed on one or more biometric readers of a firearm safe; and
- the one or more biometric readers are positioned on the exterior of the firearm safe to cause the hand to be placed in position to receive a firearm when the firearm is extended from the housing such that the firearm may be readily grasped by the user without requiring the user to change the user's hand position to receive the gun in the hand of the user;
- determining if the biometric data authorizes the user to receive the firearm; and
- sliding a carriage assembly carrying the firearm to deliver the firearm directly into the hand of the user such that the firearm may be readily grasped by the user without requiring the user to change the user's hand position to receive the gun in the hand of the user;
- determining if the biometric data authorizes the user to receive the firearm; and
- sliding a carriage assembly carrying the firearm to deliver the firearm directly into the hand of the user.

15. The method of claim 14, wherein the one or more biometric readers are placed on opposite sides of the firearm safe.

16. The method of claim 15, wherein the one or more biometric readers comprise fingerprint readers for a thumb and an index finger.

17. The method of claim 15, wherein the one or more biometric readers comprise pressure sensors for a thumb and an index finger.

18. The method of claim 15, wherein the one or more biometric readers comprise RFID readers.

* * * * *